(12) United States Patent
Danger et al.

(10) Patent No.: US 8,904,192 B2
(45) Date of Patent: Dec. 2, 2014

(54) METHOD FOR PROTECTING A PROGRAMMABLE CRYPTOGRAPHY CIRCUIT, AND CIRCUIT PROTECTED BY SAID METHOD

(75) Inventors: Jean-Luc Danger, Antony (FR); Sylvain Guilley, Paris (FR); Philippe Hoogvorst, Deuil-la-Barre (FR)

(73) Assignees: Institut Telecom-Telecom Paris Tech, Paris (FR); Centre National de la Recherche Scientifique (CNRS), Paris (FR)

( * ) Notice: Subject to any disclaimer, the term of this patent is extended or adjusted under 35 U.S.C. 154(b) by 788 days.

(21) Appl. No.: 12/933,949

(22) PCT Filed: Mar. 18, 2009

(86) PCT No.: PCT/EP2009/053212
§ 371 (c)(1),
(2), (4) Date: Mar. 8, 2011

(87) PCT Pub. No.: WO2009/118264
PCT Pub. Date: Oct. 1, 2009

(65) Prior Publication Data
US 2011/0167279 A1    Jul. 7, 2011

(30) Foreign Application Priority Data
Mar. 25, 2008 (FR) ...................... 08 51904

(51) Int. Cl.
*H04L 29/06*    (2006.01)
*G06F 7/00*    (2006.01)
*G06F 21/75*    (2013.01)
*G06F 21/55*    (2013.01)

(52) U.S. Cl.
CPC *G06F 7/00* (2013.01); *G06F 21/75* (2013.01); *G06F 21/558* (2013.01); *G06F 2207/7266* (2013.01)

USPC ............... 713/193; 713/401; 726/22; 726/26; 326/8

(58) Field of Classification Search
USPC .......................................................... 713/193
See application file for complete search history.

(56) References Cited

U.S. PATENT DOCUMENTS

2003/0140240 A1* 7/2003 Jaffe et al. ...................... 713/193
2004/0239400 A1* 12/2004 Kunemund .................... 327/408

(Continued)

OTHER PUBLICATIONS

Razafindraibe et al., "Analysis and Improvement of Dual Rail Logic as a Countermeasure Against DPA", PATMOS 2007, pp. 340-351.*

(Continued)

*Primary Examiner* — Taghi Arani
*Assistant Examiner* — Thaddeus Plecha
(74) *Attorney, Agent, or Firm* — Baker & Hostetler LLP

(57) ABSTRACT

A programmable cryptography circuit includes memory-based cells defining the logic function of each cell, integrating a differential network capable of carrying out calculations on pairs of binary variables, including a first network of cells implementing logic functions on the first component of the pairs and a second network of dual cells operating in complementary logic on the second component of the pair. A calculation step includes a precharge phase, in which the variables are put into a known state at the output of the cells, and an evaluation phase in which a calculation is made by the cells. A phase of synchronizing the variables is inserted before the evaluation phase or the precharge phase in each cell capable of receiving several signals conveying input variables, the synchronization being carried out on the most delayed signal.

17 Claims, 6 Drawing Sheets

(56) References Cited

U.S. PATENT DOCUMENTS

2005/0073346 A1* 4/2005 Elbe et al. .................. 327/215
2008/0205169 A1* 8/2008 Kuenemund et al. ......... 365/190
2008/0224727 A1* 9/2008 Verbauwhede et al. .......... 326/8
2012/0124680 A1* 5/2012 Danger et al. ................. 726/34

OTHER PUBLICATIONS

Guilley et al., "CMOS Structures Suitable for Secured Hardware", 2004, 2 pages.*

Chen et al., "Dual-Rail Random Switching Logic: A Countermeasure to Reduce Side Channel Leakage", 2006, pp. 242-254.*

Suzuki et al., "Security Evaluation of DPA Countermeasures Using Dual-Rail Pre-Charge Logic Style," Cryptographic Hardware and Embedded Systems—CHES 2006 Lecture Notes in Computer Science, LNCS, vol. 4249, pp. 255-269, XP019046826 (Jan. 1, 2006).

Bucci et al., "Three-Phase Dual-Rail Pre-Charge Logic," Cryptographic Hardware and Embedded Systems—CHES 2006 Lecture Notes in Computer Science, LNCS, vol. 4249, pp. 232-241, XP019046823 (Jan. 1, 2006).

Tiri et al., "A Logic Level Design Methodology for a Secure DPA Resistant ASIC or FPGA Implementation," Design, Automation and Test in Europe Conference and Exhibition 2004, vol. 1, pp. 246-251 (Feb. 16, 2004).

Lin et al., "Overcoming Glitches and Dissipation Timing Skews in Design of DPA-Resistant Cryptographic Hardware," Design, Automation and Test in Europe Conference and Exhibition 2007, pp. 1-6 (Apr. 1, 2007).

Popp, et al., "Masked Dual Rail Pre-Charge Logic : DPA Resistance without routing Constraints" in LNCS, Proceedings of CHES'05, vol. 3659 of LNCS, pp. 172-186, Springer, Sep. 2005.

* cited by examiner

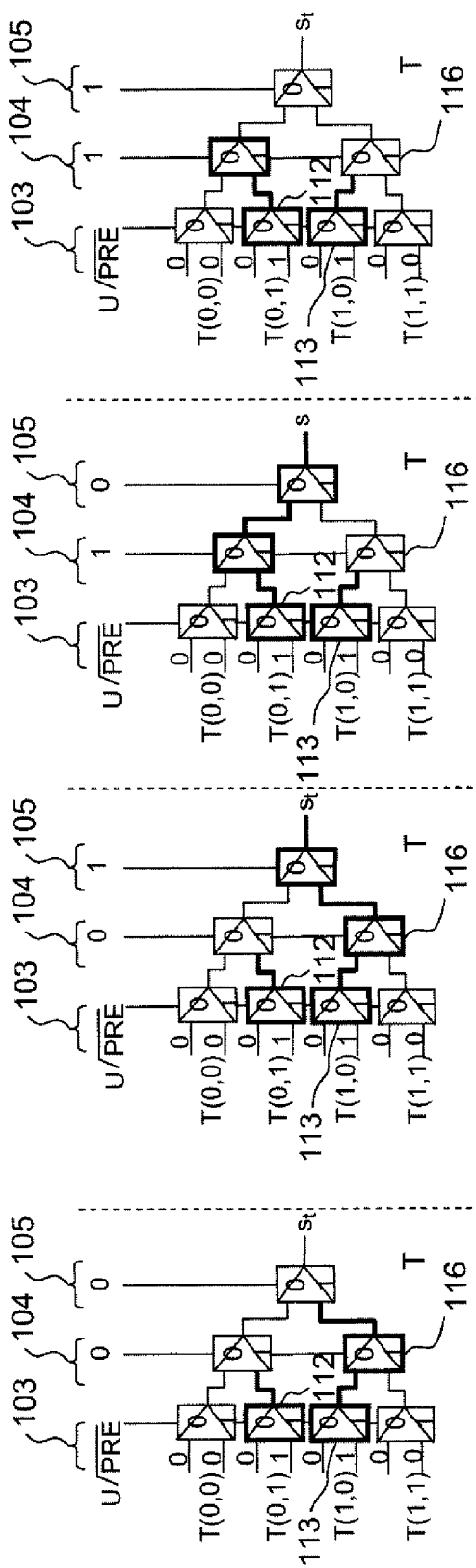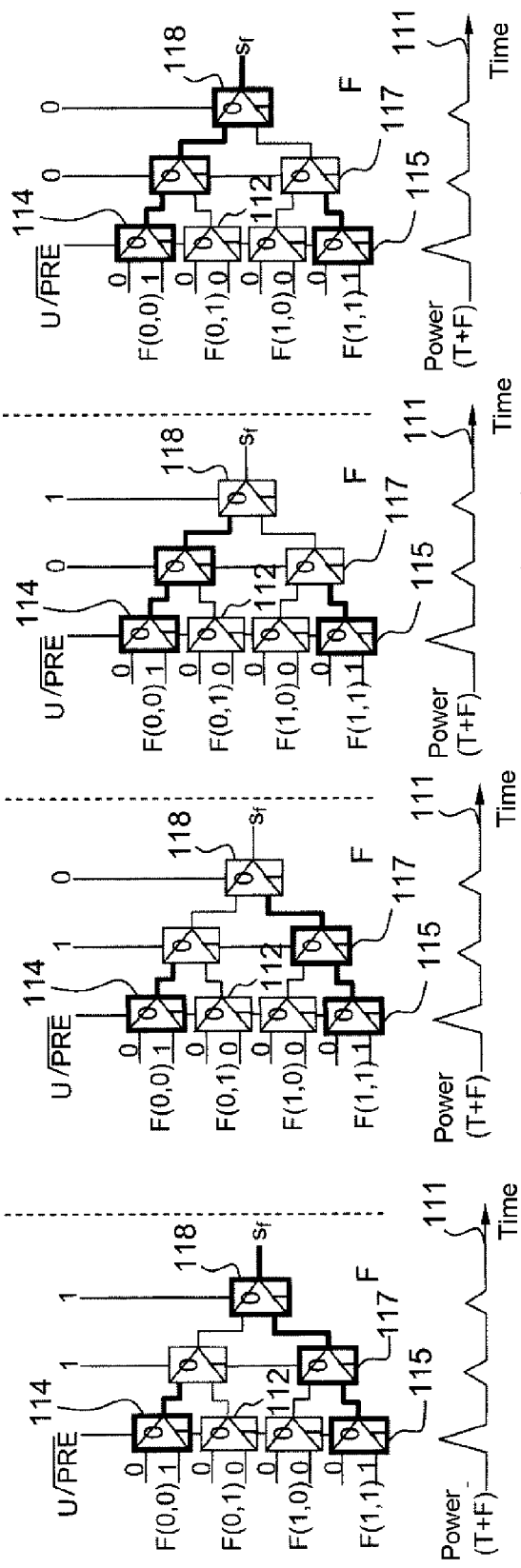
FIG.11a  FIG.11b  FIG.11c  FIG.11d

METHOD FOR PROTECTING A PROGRAMMABLE CRYPTOGRAPHY CIRCUIT, AND CIRCUIT PROTECTED BY SAID METHOD

CROSS-REFERENCE TO RELATED APPLICATIONS

This application is a National Stage of International patent application PCT/EP2009/053212, filed on Mar. 18, 2009, which claims priority to foreign French patent application No. FR 08 51904, filed on Mar. 25, 2008, the disclosures of which are incorporated by reference in their entirety.

FIELD OF THE INVENTION

The present invention relates to a method for protecting a programmable cryptography circuit. It also relates to a circuit protected by such a method. It applies notably for protecting this type of circuit against differential power analysis attacks.

BACKGROUND OF THE INVENTION

The objective of cryptography is notably to protect:
either the secret of the information by means of the encryption and its dual operation: namely decryption;
or only its integrity, by the signature and signature verification operations.

Cryptography uses reliable mathematical methods in the sense that, in the current state of public knowledge, there are no attack methods that are more rapid than exhaustive attack corresponding to testing all possible keys.

In general, the encryption methods involve complex calculations necessary for system security. This complexity does not pose particular problems for computers, but it does constitute a drawback in the case of devices used by the general public not having a high computing power, in general devices controlled by low-cost microprocessors. The consequences may therefore be of several orders, thus for example a bank card would take several minutes to sign a transaction or a digital pay television decoder would be unable to follow the data rate involved.

To alleviate this type of problem without increasing the cost of systems, it is usual to add an aid to the central processing unit controlling the device, in general in the form of a cryptography-dedicated coprocessor.

However, whether it is implemented by the central processing unit or by a specialized coprocessor, the cryptography algorithm is in all cases implemented by a physical electronic device. However, electronic devices have inevitable imperfections due to the inherent properties of the laws of electricity.

Thus, cryptographic systems reliable from a mathematical standpoint may be attacked by exploiting the imperfections of the physical systems implementing the algorithm:
the duration of the calculations may depend on the values of the data, in particular on time-optimized software systems, which may give rise to timing attacks enabling, in certain cases, all of the secret keys to be discovered on the basis of simple execution time measurements;
the instantaneous power consumption may also depend on the data and may give rise to series of attacks such as:
SPA (simple power analysis) that attempts to differentiate the operations executed by a central processing unit on the basis of a measurement of its power consumption, measured during a cryptographic operation;
DPA (differential power analysis) that uses statistical operations on many power consumption measurements, carried out during cryptography operations on random messages and with a constant key to validate or invalidate a hypothesis made on a limited portion of the key;
template attacks which:
in a first phase, use a device identical to the attacked device, except that this identical device contains no secret, to construct power models indexed by the value of a limited portion of the key; and
in a second phase, use a few measurements of the power consumed by the attacked device to determine the model to which the measured power levels are closest and thus determine the value of this sub-key;
any electric current flowing in a conductor generates an electromagnetic field, the measurement of which may give rise to attacks identical in their principle to attacks based on power consumption, notably by DPA; and
finally, attacks disturb the operation of the systems so as to exploit the false results in order to discover the secrets of the system.

Any imperfection of a physical device implementing a cryptography algorithm and capable of leaking information relating to the secrets stored in the memory of the device is referred to as a "cached channel".

Reconfigurable circuits of the FPGA (Field Programmable Gate Array) type are very widely used in applications requiring cryptography. There are at least two reasons why. Firstly, cryptography standards change rapidly, certain algorithms with vulnerabilities are replaced with others that correct the deficiencies. In addition, cryptography parameters, such as key size, are also variable. Flexibility is therefore necessary, but without compromising performance. Indeed, cryptography algorithms protect because their calculations are complex. FPGAs meet this requirement for flexibility and power perfectly. Secondly, certain cryptography applications are broadcast in small volumes. This is notably the case, for example, of systems on board satellites. The FPGA solution is thus more efficient than, for example, dedicated implementation of the ASIC type. However, like all cryptography circuits, FPGAs equipped with cryptography functions are vulnerable to attack, notably by cached channels.

A known countermeasure solution for countering attacks, notably by power consumption measurement, uses differential logic, more particularly duplication of logic networks. Thus, each logic gate is duplicated, as dual physical gates operating in complementary logic in such a way that at any moment a dual port is consuming, making the power consumption independent of the data and therefore unusable, notably for a DPA. To ensure a constant number of transitions at each calculation, and therefore a constant power consumption, the differential logic requires two working phases:
a precharge phase to put the variables in a known state; and
an evaluation phase in which the calculation is carried out with a constant number of transitions.

The complexity of a cryptography circuit is thus more than doubled owing to the use of differential logic and dual-rail connections necessary for its implementation.

Although certain FPGAs integrate counter-pirating protection means into their configuration, none has been designed to withstand attacks on their implementation. The protection means therefore involve solutions at the RTL (Register Transfer Level), notably such as the WDDL logic proposed in the document by K. Tiri and I. Verbauwhede "A logic Level Design Methodology for a Secure DPA Resistant ASIC or FPGA Implementation" in Proceedings of DATE'04, pages 246-251, February 2004 or else the MDPL logic proposed in the document by T. Popp and S. Mangard "Masked Dual Rail Pre-Charge Logic: DPA Resistance without routing Constraints" in LNCS, published in Proceedings of CHES'05, volume 3659 of LNCS, pages 172-186, Springer, September 2005. These solutions are insufficient as they present logic and technological biases that can be exploited by an attacker.

In all the types of differential logic proposed, despite an apparent power consumption balance, second-order phenomena reveal imbalances and thus information leaks. The most important phenomena are notably the anticipated evaluation and the technological differences in differential networks.

SUMMARY OF THE INVENTION

One object of the invention is notably to enable these phenomena to be circumvented and to make it significantly more difficult for attacks by power consumption measurements, in particular on cryptography circuits in FPGA technology.

For this purpose, one subject of the invention is a method for protecting a programmable cryptography circuit, said method using gates themselves composed of memory-based cells defining the logic function of each cell, the circuit being configured so as to integrate a differential network capable of making calculations on binary variables composed of pairs of signals, the differential network comprising a first network of cells implementing logic functions on the first component of the pairs and a second network of dual cells operating in complementary logic on the second component of the pairs. The calculation comprises two phases: a precharge phase, in which the two signals of all the variables are put into a known identical state (for example 0), an evaluation phase, in which the actual calculation is made by the cells, in which case a single signal out of the two representing each variable is active, and a synchronization phase before each precharge and evaluation phase.

For example, the variable synchronization phase is carried out in a group of variables and is inserted before the evaluation phase in each cell capable of receiving several signals conveying input variables, the synchronization being carried out on the most delayed signal.

The variable synchronization phase may also be carried out in a group of variables and be inserted before the precharge phase in each calculation cell capable of receiving several signals conveying input variables, the synchronization being carried out on the most delayed signal.

The synchronization phase is for example carried out, for each cell of the differential network, by a rendezvous mechanism using unanimity cells, the inputs of which are common to the inputs of said cell of the differential network and the output of which controls the operation of said cell, the rendezvous taking place when there is unanimity of values on the inputs of the unanimity cells, the outputs of the gate changing only when the rendezvous is reached after the synchronization.

To make the method easier to understand, all the pairs of signals (corresponding to noncomplemented and complemented variables) will be considered to be in the (0,0) state during the precharge phase. This reasoning also applies to the (1,1) state.

The unanimity cells are of two types: a unanimity-to-1 $U_1$ cell and a unanimity-to-0 $U_0$ cell, having the common inputs and enabling the evaluation phase and the precharge phase respectively:

the unanimity-to-1 $U_1$ cell generates a signal enabling the evaluation as soon as all the input variables have left the precharge state. This condition amounts to stating that all the pairs of input signals have switched from the precharge state (0,0) to either the (0,1) state or the (1,0) state; and the unanimity-to-0 $U_0$ cell generates a signal enabling the precharge as soon as all the input variables have left the evaluation state. This condition amounts to stating that all the pairs of input signals have switched from the (0,1) or (1,0) evaluation state to the precharge state (0, 0).

The calculation cells are "frozen" (or stored in memory) as long as the unanimity-to-1 or the unanimity-to-0 is inactive. This is provided by the rendezvous memory functions.

In one particular embodiment, a gate receives a global signal PRE for resetting the input variables to zero before the precharge phase. This signal is common to all the gates and is ahead of the other signals. The precharge provided by PRE makes it possible to eliminate both the unanimity $U_0$ cell and the necessary memorization at the rendezvous.

The synchronization phase uses, for example:
a $U_1$ unanimity cell that generates a signal enabling the evaluation as soon as all the input variables have left the precharge state; and
a gate combining the output of the $U_1$ cell with the reset-to-zero signal PRE, the combined synchronization signal U/$\overline{PRE}$ enabling, depending on its binary value, the precharge phase (U/$\overline{PRE}$=0) or the evaluation phase (U/$\overline{PRE}$=1).

The subject of the invention is also a circuit protected according to the method described above. The programmable circuit, for example a programmable cryptography circuit, comprises gates themselves composed of memory-based cells defining the logic function of each cell, said circuit integrating a differential network capable of making calculations on binary variables composed of pairs of signals, the differential network comprising a first network of cells implementing logic functions on the first component of the pairs and a second network of dual cells operating in complementary logic on the second component of the pairs. A calculation step comprises a precharge phase, in which the variables are put into a known state at the input of the cells, an evaluation phase, in which a calculation is made by the cells, and a synchronization phase before each precharge and evaluation phase.

In one particular embodiment, since a cell of the differential network comprises the memory defining its logic function associated with a tree of multiplexers, the inputs of the multiplexers of the first column of the tree receiving the values of the memory, and the output of the last multiplexer forming the output of the cell, the combined synchronization signal U/$\overline{PRE}$ controls the multiplexers of the first column, the multiplexers of the other columns being controlled by the input signals of the cell.

For example, the pairs of signals of the input variables are associated with the same column of multiplexers in their respective cell.

The circuit comprises for example at least one protected gate, four cells of 2n inputs being used to generate a protected gate of 2n−1 inputs, two cells being used to produce the unanimity $U_1$ and two cells for the differential network.

The circuit comprises, for example, at least one protected gate, eight cells of 2n inputs being used to generate a protected gate of 2n inputs, four cells being used to produce the unanimities $U_1$ and $U_0$, two cells being used for the differential network and two cells being used for the rendezvous for "freezing" the outputs of the gate, the logic functions used having to respect the increasing property.

In one embodiment, the circuit may comprise at least one protected cell, two cells of 2n inputs being used to generate a protected gate of n inputs, the two cells being used to produce the differential network integrating the unanimity, the logic functions used having to respect the increasing property.

BRIEF DESCRIPTION OF THE DRAWINGS

Other features and advantages of the invention will become apparent from the following description, in conjunction with the appended drawings which show:

FIGS. 11a, 11b, 11c and 11d, an illustration of the power balances within a circuit according to the invention;

DETAILED DESCRIPTION

Figure 1:
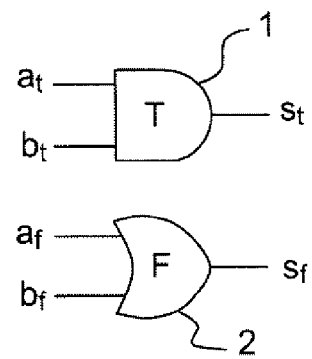
FIG. 1, an AND gate in differential logic.

FIG. 1 shows an AND gate 1, 2 in WDDL logic, as an example of illustrating the principle of the differential logic. This gate is made up of two dual logic networks 1, 2, operating in complementary logic modes. The data is shown in dual-rail form, each logic variable a being formed from a pair of signals $(a_t, a_f)$ encoded in the following manner:

(0,0) for the rest state: the value of a is not defined—it is denoted by Ω hereafter;
(1,0) is an active state in which a=1;
(0,1) is an active state in which a=0.

A logic gate H having two inputs a and b and an output s is physically represented by two gates 1, 2 having the logic functions $T(a_t,b_t)$ and $F(a_f,b_f)$ respectively, such that:

$$s_t = T(a_t, b_t)$$

$$s_f = F(a_f, b_f).$$

The "true" logic network corresponds to the function T that delivers the signal $s_t$. The "false" dual logic network corresponds to the function F that delivers the dual signal $s_f$. FIG. 1 illustrates the "AND" gate in which the "true" network 1 carrying out the function T receives the two noncomplemented inputs $a_t$ and $b_t$. The "OR" dual function carries out the function F. For a signal x, the following equations are satisfied:

$$T(x) = H(x)$$

$$F(x) = \overline{H}(\overline{x}).$$

Figure 2:
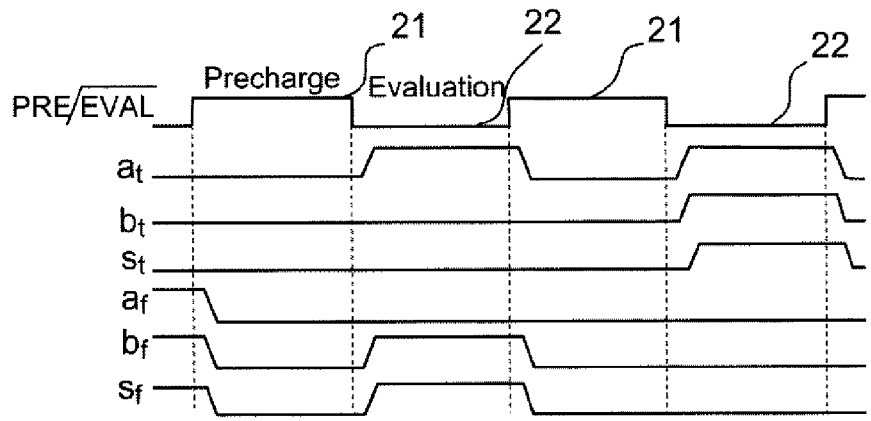
FIG. 2, a representation of the phases of a calculation step in differential logic in a programmable circuit, for example of the FPGA type.

FIG. 2 shows the phases of a calculation step in differential logic, for example of the WDDL (Wave Dynamic Differential Logic) type. This step comprises successive phases, namely the precharge phase 21 and the evaluation phase 22. Examples of states of the input variables $a_t, b_t, a_f, b_f$ and of the corresponding output variables $s_t, s_f$ are shown under the precharge and evaluation phases. The timing diagrams of FIG. 2 show that the number of transitions is the same—three in this case—when a variable switches from the precharge phase to the evaluation phase, and vice-versa. Since the power consumption is directly associated with the number of transitions notably in CMOS electronic technologies, the power consumed is thus balanced.

However, despite apparent power balance, second-order effects may give rise to data leaks. For example, if $a_t$ is ahead of or lags behind $a_f$, the time shift may be perceived by an attacker who therefore deduces therefrom the value of the variable a. This phenomenon may be thwarted by using a balanced dual-rail interconnection, that is to say with two lines perfectly balanced from an electrical standpoint, notably in terms of length and capacitance. Assuming that the dual-rail lines are balanced, there are many other phenomena allowing the possibility of attack in the currently proposed logic modes. As indicated above, the most important ones are notably anticipated evaluation and technological differences in differential networks.

Figure 3:
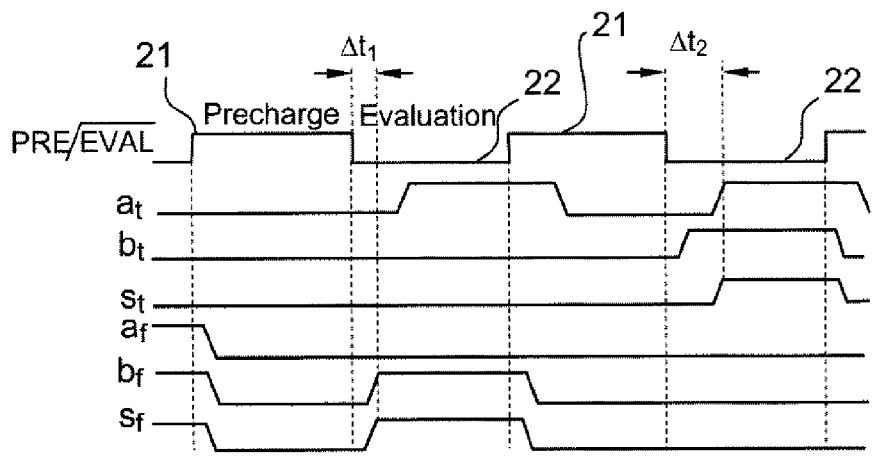
FIG. 3, an example of anticipated evaluation in differential logic.

FIG. 3 illustrates timing diagrams in WDDL logic with anticipated evaluation. If the signal a is ahead of or lags behind the signal b, an anticipated evaluation may occur as illustrated in FIG. 3. The delay between the components of the signals a and b is therefore reflected at the output of the gate 1, 2 by the logic difference between the AND function and the OR function. From the time intervals $\Delta t_1$ and $\Delta t_2$ it is possible to know whether the signal a is equal to 0 or equal to 1. More precisely in FIG. 3, b is always faster than a. Depending on whether b is equal to 0, as in the first half of the timing diagrams, or 1, as in the second half, the output evaluates more slowly, at $\Delta t_1$, or more quickly, at $\Delta t_2$, thereby betraying the value of b. In the same way as there is an anticipated evaluation 22, there is an anticipated precharge 21 which means that some signals switch more rapidly to 0 than others.

Notably, there are two reasons making b faster than a:

the data signals $b_t$ and $b_f$ are connected directly to the gate whereas $a_t$ and $a_f$ pass via many interconnections and therefore many switching elements;

the data signals $a_t$ and $a_f$ pass via intermediate gates, whereas $b_t$ and $b_f$ arrive directly.

Another phenomenon, leading to vulnerability to attack by power consumption, depending on the technology, is the difference in energy expended between a logic network and its complement. For example, in WDDL logic, for the AND gate if a is equal to 1, the AND gate switches if b is equal to 1, otherwise it is the OR gate. It is therefore possible from this to deduce the value of b if the AND and OR gate transitions do not have the same power consumption.

The MDPL logic overcomes this problem, but at an additional cost. It is firstly necessary to have true random number generator that produces one mask bit per clock cycle. In addition, one input of each gate must be dedicated for the mask.

Because of its differential nature, WDDL logic is necessarily twice as complex as normal logic. Moreover, there is an additional important constraint on the choice of functions T and F, these having to be increasing functions. This condition makes it possible both to prevent parasitic switching during calculation phases and to guarantee propagation of the precharge value along the logic cone. This increasing function constraint limits the type of cells an FPGA. MDPL logic is even more complex to produce in an FPGA.

The invention notably produces a novel type of logic that eliminates the defects of anticipated evaluation and technological differences, which will be called hereinafter BCDL logic, standing for balanced cell-based differential logic. In a circuit operating in BCDL logic:
- a data synchronization step is added at each gate before the actual switching to the precharge phase or to the evaluation phase;
- the synchronization is carried out on a data group; and
- the synchronization calculation is carried out in parallel with the calculation carried out by the circuit.

The invention applies this operation:
- at the global level, that is to say between the calculation cells T,F; and
- at the local level, that is to say internally to the calculation cells.

Figure 4:
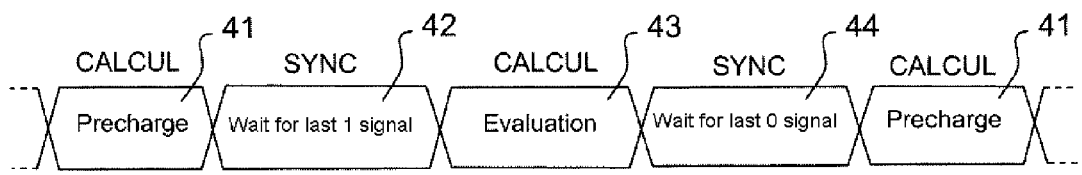
FIG. 4, an illustration of synchronization phases inserted between the precharge phase and the evaluation phase in a calculation step within a BCDL (Balanced Cell-Based Differential Logic) circuit according to the invention.

FIG. 4 illustrates the synchronization step. This synchronization step is carried out before the evaluation phase, at each gate, through the dual networks T,F. Notably, it enables the anticipated evaluation and precharge problems to be avoided.

The synchronization consists in waiting for the most delayed signal. The causes of anticipated evaluation resulting from the difference in calculation time between two signals are therefore eliminated by waiting for the most delayed signal.

FIG. 4 illustrates the four successive synchronization and calculation phases 41, 42, 43, 44 making up a precharge and evaluation cycle. A first phase 41 executes the precharge calculation, a second phase 42 performs a first synchronization by waiting for example for the last signal in state 1. This phase is followed by the evaluation phase 43, which is itself followed by a synchronization phase 44 before the precharge step 41 of the next cycle. This synchronization step 44 imposes the wait, for example for the last signal in state 0.

Figure 5:
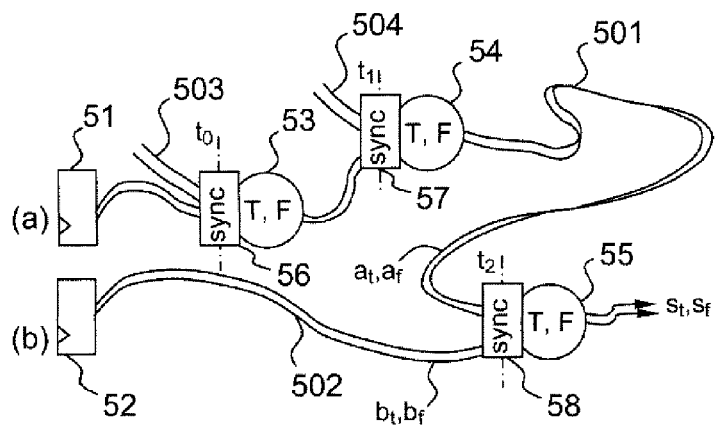
FIG. 5, an illustration of the path differences within a differential network in order to reach a calculation cell.

FIG. 5 illustrates a part of the dual logic networks comprising two shift registers 51, 52 and dual T,F gates 53, 54, 55. A first path 501 conveys a signal a coming from a first shift register 51 and a second path 502 conveys a signal b coming from a second shift register 52. The two paths join up at the input of a T,F gate 55, the latter delivering an output signal s. The signal a is delayed in the first path by a succession of gates 53, 54. These gates also receive as input signals coming from other paths 503, 504. At the input of each gate, a block 56, 57, 58 performs a synchronization. In the example shown in FIG. 5, the final gate 55 delivering the signal s performs its calculation only at a time $t_2$ corresponding to the arrival of the most delayed signal, here the signal a in this example.

The synchronization in asynchronous logic takes place between two signals with a rendezvous cell RV. The cells RV switch to a logic value L only if the two inputs have the same logic value L, otherwise they do not change state. A cell RV is therefore a memory that changes state only if there is unanimity, to 0 or to 1, of the input signals. In BCDL logic, the rendezvous takes place on a data group in one and the same cell of the FPGA circuit. Specific $U_0$ and $U_1$ cells are for example used.

A $U_1$ cell generates a signal enabling evaluation, this signal switches to 1 as soon as all the data has left the previously defined state $\Omega$. More particularly, the signal denoted by $U_1(x, y, \ldots)$ is defined by the following equation:

$$U_1(x,y,\ldots)=1 \text{ if } x\neq(0,0) \text{ and } y\neq(0,0)\ldots, \text{ otherwise}$$
$$U_1(x,y,\ldots)=0 \qquad (1)$$

A $U_0$ cell generates a signal enabling the outputs to return to the state $\Omega$. This signal switches to 1 as soon as each of the inputs is in the state $\Omega$ according to the following equation:

$$U_0(x,y,\ldots)=1 \text{ if } x=y=(0,0)\ldots, \text{ otherwise}$$
$$U_0(x,y,\ldots)=0 \qquad (2)$$

This calculation is therefore started only if there is unanimity, that is to say if $U_0$ or $U_1$ are active, and the calculation is frozen as long as there is no unanimity, that is to say if $U_0$ and $U_1$ are inactive.

Figure 6:
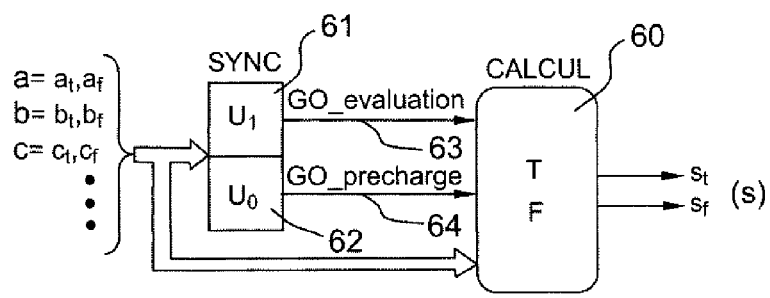
FIG. 6, the operating principle of a BCDL gate for synchronizing the variables at the input followed by the calculation in the differential network.

FIG. 6 illustrates the principle of data group synchronization. There is parallel input of the data a, b, c to the T,F dual port 60, which performs the precharge or evaluation calculation, and to the $U_1$ cell 61 and $U_0$ cell 62. The $U_1$ cell sends an evaluation enable signal 63 to the gate 60 and the $U_0$ cell sends a precharge enable signal 64 to the gate.

The precharge calculation is simpler than the evaluation calculation since all the signals have to switch to the 0 state whereas the evaluation corresponds to a true calculation on signals carrying the information. This property may be exploited in BCDL logic while eliminating for example the synchronization phase 44 before the precharge using a global reset-to-zero signal for example, which is more rapid than the other signals.

Figure 7:
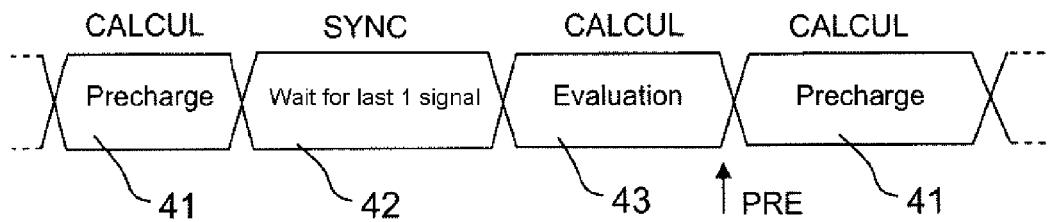
FIG. 7, an illustration of the simplified calculation phases in a BCDL gate according to the invention.

FIG. 7 illustrates this signal PRE which sets all the signals to zero just before the precharge phase 41. The precharge and evaluation cycle comprises in this case only three phases, including only a single synchronization phase 42 before the evaluation phase 43. This simplifies the structure of the gate, notably for the following two reasons:
- it is no longer necessary to perform the unanimity-to-0 step as it is replaced by the signal PRE; and
- since the signal PRE is ahead, it is no longer necessary to store the output of the gate so that it changes only upon unanimity to 0 or to 1 (the rendezvous). The output changes to 0 immediately after the arrival of the signal PRE and can switch to 1 only if there is unanimity to 1.

Figure 8:
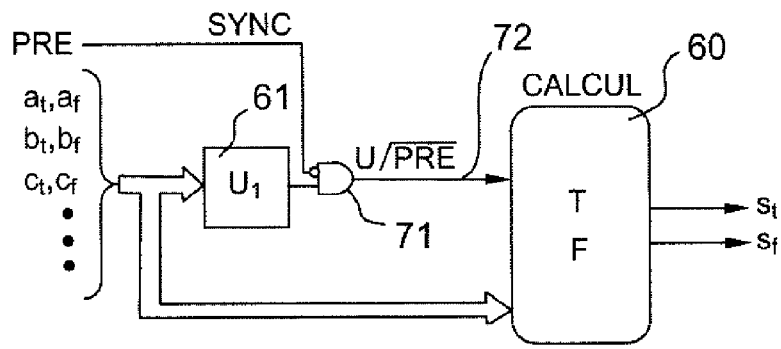
FIG. 8, the operating principle of a BCDL gate for implementing the aforementioned simplified calculation phases using a global signal.

FIG. 8 illustrates a simplified gate structure in BCDL logic, since the unanimity to 0 necessary in the case of evaluation, as illustrated by FIG. 7, is replaced by an AND gate 71 receiving the precharge switching command via the global precharge signal PRE. The signal U/$\overline{\text{PRE}}$ as output 72 from the AND gate thus makes it possible to synchronize the calculation:
- when U/$\overline{\text{PRE}}$ switches to 0, just after the signal PRE, the precharge is forced independently of the inputs; and
- when U/$\overline{\text{PRE}}$ switches to 1, indicating that one part of the signal PRE is at 1 and that also the rendezvous of the input values has been effected, the evaluation phase starts.

Figure 9:
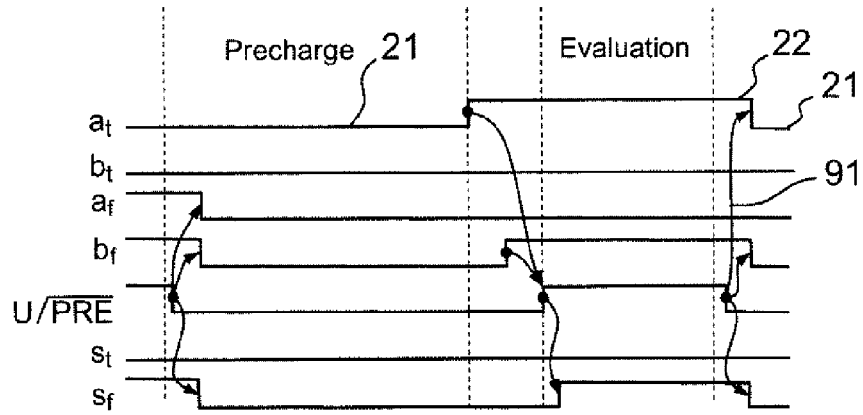
FIG. 9, a representation of the timing diagrams for the signals involved in the aforementioned calculation phases.

FIG. 9 shows the timing diagrams for the signals a, b, s and U/$\overline{\text{PRE}}$ during the precharge phase 21 and the evaluation phase 22. These timing diagrams show that the precharge phase 21 is forced independently of the inputs during the transition 91 of the signal U/$\overline{\text{PRE}}$.

In the solutions explained above, applied at the global level, the BCDL logic is used to combat the problems associated with anticipated evaluation throughout the circuit. The robustness with respect to attacks must also be verified locally at the level of a single BCDL gate, in particular to avoid technological differences and local anticipated evaluation. Moreover, the addition of the synchronization must not be to the detriment of a great increase in complexity.

Figure 10:
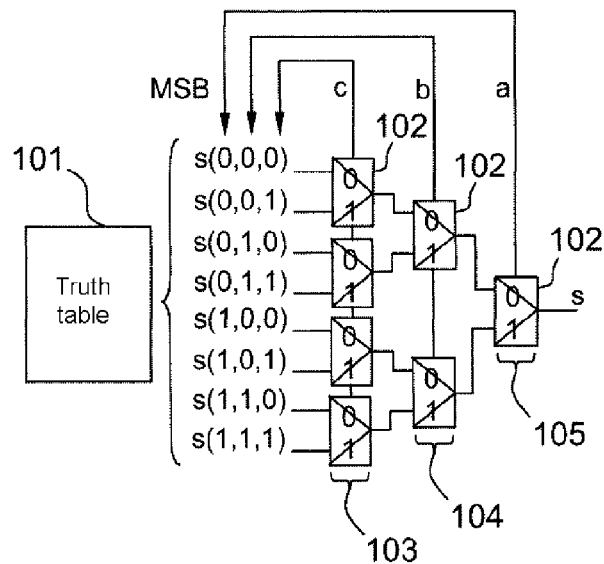
FIG. 10, a representation of the architecture of a calculation cell in a programmable network, notably of the FPGA type.

FIG. 10 illustrates the structure of a cell of an FPGA circuit having three inputs a, b, c. In an FPGA circuit, the logic is performed in memory-based cells comprising LUTs (look-up tables) 101 defining the logic function of the cell. FIG. 10 shows that the structure of the cell is based on a look-up table (LUT) 101 associated with a tree of multiplexers 102 forming three columns 103, 104, 105. The look-up table 101 stores the binary values of the function s for each of the triplets (x, y, z) in which x, y and z take the value 0 or the value 1.

The first column, or input column, is formed from the multiplexers 102 of the first stage of the tree, the third column 105 being formed from the multiplexer of the last stage, i.e. the output multiplexer. The inputs a, b, c control the multiplexers. The number of columns thus corresponds to the number of inputs. Each of the values s(x, y, z) of the function is present at the input of a multiplexer of the input column 103. The various combinations of binary values a, b, c which control the multiplexer stages enable the inputs of the input column 103 to be selected.

According to the invention, the local robustness is improved on the basis of the following two pinout modes:
- the signal U/$\overline{\text{PRE}}$ enters the first column of the tree of multiplexers; and
- the pairs of "true" inputs $e_t$ and "false" inputs $e_f$ are associated with the same respective pin on the gate T and on the gate F.

These pinout modes make it possible to achieve significant results as regards local security, and they are very inexpensive to implement.

Firstly, there is no parasitic switching. Since the signal U/$\overline{\text{PRE}}$ switches first during the precharge phase, the internal equipotentials are all forced to 0 without any risk of parasitic switching when the data inputs switch. Likewise, this signal switches last before the evaluation phase. Thus, the multiplexers controlled by the data select zeros. The signal U/$\overline{\text{PRE}}$ then lets the value of the function pass through the prepositioned multiplexers 102.

Secondly, the complexity is reduced. This is because, for the same reason, there is no need to have increasing functions in order to avoid parasitic switching, since the multiplexers have already been correctly positioned on the inputs. This makes it possible notably to use all possible functions, up to the number $2^n$, for an n-input LUT, offering much broader optimization potential than with a subassembly of increasing functions. For example, for a 4-input LUT, there are only 166 increasing functions from among the 65536 possible functions.

Thirdly, the technological bias is greatly reduced. The total number of T and of F equipotential switchings does not change as a function of the combination of inputs. This number is constant, equal to $2^n-1$ when n is the number of inputs of the LUT. This therefore makes it difficult to discriminate the T activity from the F activity, since the power consumption profile is identical for the T and F pair. In addition, the succession of switchings by the multiplexers over time is independent of the data.

Finally, there is no anticipated evaluation and anticipated precharge within the LUT table. This is because it is the signal U/$\overline{\text{PRE}}$ that delays the evaluation, arriving always after the signals, and which, without waiting for the data, forces the precharge. In other words, the evaluation is always delayed and the precharge always anticipated, independently of the data.

FIGS. 11a, 11b, 11c and 11d illustrate the power consumption balancing when switching in BCDL logic in the example of a three-input LUT table. More particularly, these four figures show all the combinations in a two-input XOR gate when the signal U/$\overline{\text{PRE}}$ switches. In all these figures, the top cell is the "true" gate T and the bottom cell is the "false" gate F. The time-dependent global power peaks corresponding to the switching of the circuits T and F are represented by a curve 111, the peaks facing columns, and correspond to the power consumed when their corresponding columns switch. To give an example, FIG. 11a corresponds to the case in which the input signal, connected to the second 104 and third 105 columns, is equal to (0,0). The multiplexers 112, 113, 114, 115, 116, 117 and 118 shown in bold see their outputs switch. The curve 111 shows the power peaks corresponding to this first combination (0,0). The power curves 111 associated with the combinations in the following figures are identical. There is therefore global balancing in the T, F pair, whether in terms of switching time or in terms of power consumption. In other words, as FIGS. 11a, 11b, 11c and 11d show, there is a simultaneous number of switching operations for each combination (0,0), (0,1), (1,0) and (1,1).

Using a program for implementing an application in any FPGA system, switching to BCDL logic may take place automatically. An analysis tool, obtained from standard FPGA tools, allows the logic to be transformed to the logic explained above. The analysis is limited to substituting logic elements in the variants of the BCDL gates. The routing of the pairs of interconnect wires must be carried out in a balanced manner.

Figure 12:
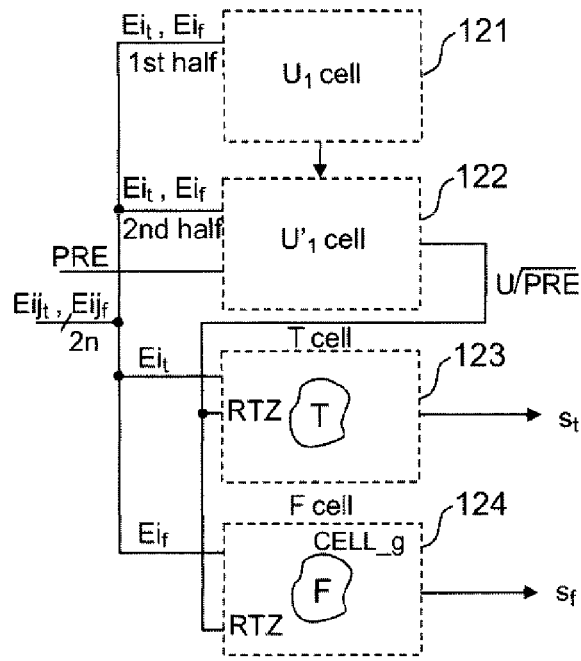
FIG. 12, a representation of the structure of a BCDL gate.

FIG. 12 illustrates the structure of a BCDL gate containing four cells 121, 122, 123 and 124, namely two unanimity-to-1 cells 121 and 122, one cell 123 for the function T and one cell 124 for its dual function F. Cascading of the $U_1$ cells described above is possible. For example, a BCDL gate is then made up of:
- two dual cells 123, 124, operating in complementary logic, each cell receiving n inputs, $Ei_t$ in the case of the T cell and $Ei_f$ in the case of the F cell, i varying from 1 to n, the T and F cells delivering the components $s_t$ and $s_f$ of the output signal respectively; and
- two $U_1$ cells for making the unanimity to 1 and for generating the signal U/$\overline{\text{PRE}}$, each cell receiving n inputs corresponding to one half of the pairs $(Ei_t,Ei_f)$.

Figure 13:
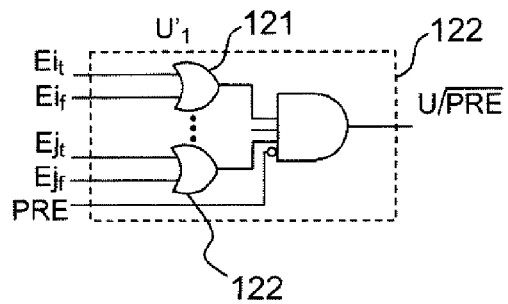
FIG. 13, an exemplary embodiment of the unanimity function in an FPGA cell.

FIG. 13 illustrates an embodiment of the $U'_1$ cell 122 connected in cascade to the $U_1$ cell for making the unanimity. The inputs $(Ei_t,Ei_f) \ldots (Ej_t,Ej_f)$ are connected to OR gates 121 and the outputs of these OR gates are combined at the input of an AND gate 122, the inverse signal $\overline{\text{PRE}}$ being combined at the input of this gate 122 with the outputs of the OR gates. The output of the AND gate 122 delivers the signal U/$\overline{\text{PRE}}$.

In one implementation of a BCDL gate without global precharge and with a large number of inputs, the global precharge signal PRE may or may not be used. The calculations are then carried out in four phases as indicated above. This notably makes it possible to gain one input on the LUT tables for the T and F gates and thus increase the number of inputs. On the other hand, the global precharge must be replaced with the unanimity-to-0 calculation. Moreover, it is necessary to make the rendezvous (i.e. to "freeze" the calculation) when there is no unanimity. Specific rendezvous cells are used for this purpose.

Figure 14:
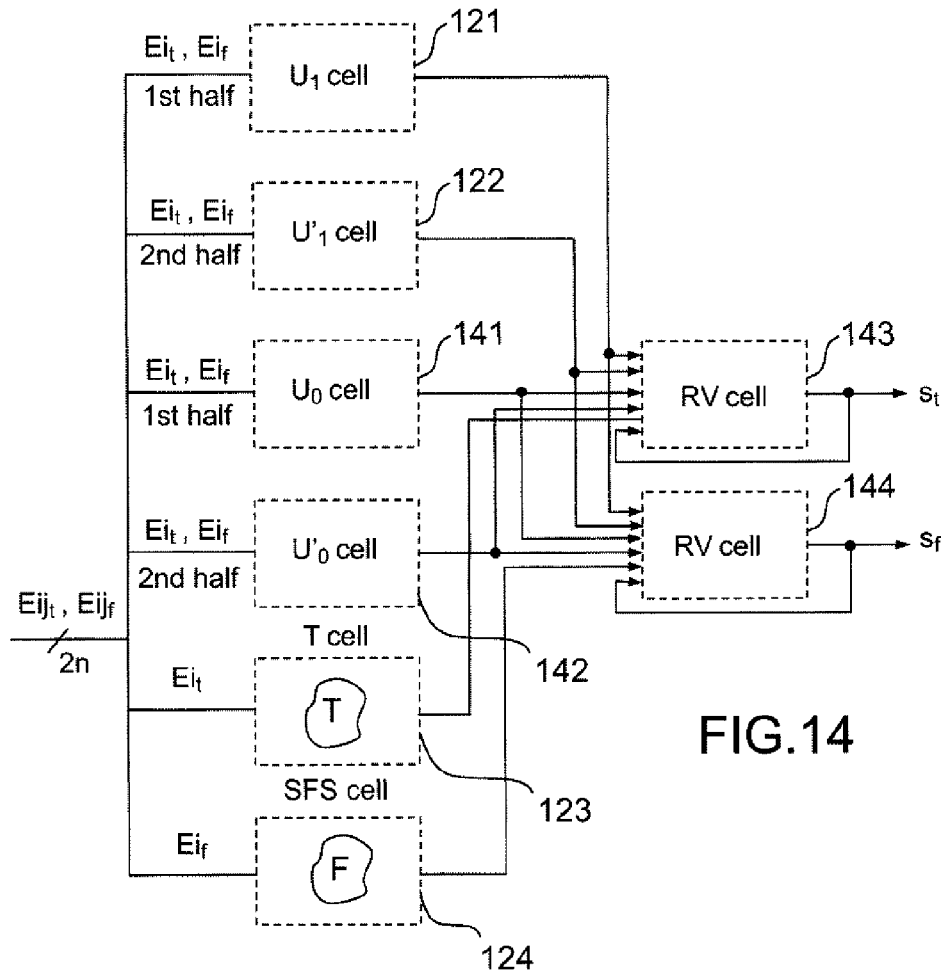
FIG. 14, an exemplary embodiment of a BCDL gate, not having a global precharge input, making it possible to accept a large number of inputs and requiring rendezvous cells.

A BCDL gate with no global precharge, as illustrated in FIG. 14, is therefore made up of:

two cells 123, 124 operating in complementary logic for the T and F functions, each cell receiving n inputs;

at least two rendezvous cells RV 143, 144, delivering the components $s_t$ and $s_f$ of the output signal, the RV cells being associated with the cells having the T and F functions respectively, the exact number depending on the number of inputs of the LUT;

two $U_0$ cells 141, 142 for making the unanimity to 0, the outputs of which are connected to the inputs of the rendezvous cells; and two $U_1$ cells 121, 122 for making the unanimity to 1, the outputs of which are connected to the inputs of the rendezvous cells.

The gate illustrated in FIG. 14 is notably adapted for implementing a DES encryption algorithm substitution box. The BCDL gate with no global precharge must always satisfy the condition of having increasing functions, for example like the WDDL logic.

Figure 15:
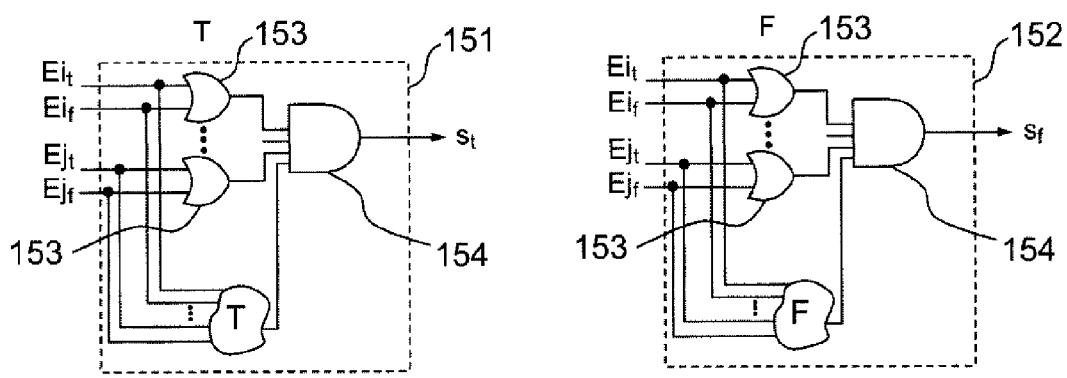
FIG. 15, an exemplary embodiment of a BCDL gate having few inputs and in which the unanimity and calculation functions are integrated into the same cell.

In the case of an implementation of a BCDL gate with no global precharge with few inputs, the unanimity-to-1 function may be integrated into the T and F cells as illustrated in the example shown in FIG. 15. It is then no longer necessary to use the signal PRE since the unanimity-to-1 function resets the T and F functions to zero with the arrival of the most rapid signal. This principle is however not applicable when the $U_1$ cells are separated, as there is then a signal path, it being possible for the T and F cells to switch to the precharge phase earlier than anticipated if the $U_1$ cell is slower. In this case, there is again propagation of the 0 value of the precharge since the signal PRE does not exist, and it is necessary to employ increasing functions to prevent parasitic switching and to propagate the precharge along the logic cone. In the example shown in FIG. 15, the dual components $(Ei_t, Ei_f)$ of the input signals are sent to an OR gate 153 integrated into the T cell 151 and the F cell 152, these inputs moreover being connected to the inputs of the actual T and F gates of the cells 151, 152. The outputs of these cells and the outputs of the OR gates 153 are combined with the input of an AND gate 154, the outputs of which deliver the components $s_t$ and $s_f$ of the output signal. FIG. 15 illustrates a gate in the particular case of a function having a small number of inputs. The unanimity-to-1 logic is integrated into the T and F cells, thus making it possible to switch to the precharge phase with the most rapid signal. s

The invention claimed is:

The invention claimed is:

1. A method for protecting a programmable cryptography circuit, said method comprising:

using gates comprising table-based cells defining the logic function of each of the table-based cells, the programmable cryptography circuit being configured to integrate a differential network configured to make calculations on binary variables, each of the binary variables comprising pairs of signals, the differential network comprising a first network of cells implementing logic functions on a first component of the pairs and of signals and a second network of dual cells operating in complementary logic on the second component of the pairs of signals, and making calculations on the binary variables during:
a precharge phase, in which the binary variables are put into a known state at an input of each cell of the differential network,
an evaluation phase, in which a calculation is made by each cell of the differential network, and
a synchronization phase, in which multiple signals representing multiple input binary variables are received and logic takes place on the multiple input binary variables, the synchronization phase being carried out before each of the precharge and evaluation phase, and the synchronization phase being carried out on a signal of the multiple signals having a greatest delay.

2. The method as claimed in claim 1, wherein the synchronization phase is carried out, for each cell of the differential network, by a rendezvous mechanism using unanimity cells, inputs of the unanimity cells being common to the inputs of said cell of the differential network, and outputs of the unanimity cells controlling operation of said cells, a rendezvous of the rendezvous mechanism taking place when there is unanimity of values on the inputs of the unanimity cells, outputs of a gate changing when the rendezvous is reached.

3. The method as claimed in claim 2, wherein the synchronization phase uses two unanimity cells, $U_1$ unanimity cell and $U_0$ unanimity cell, having common inputs to the differential network and authorizing the evaluation phase and the precharge phase respectively:

the $U_1$ unanimity cell generating a signal authorizing the evaluation phase as soon as all inputs of the $U_1$ unanimity cell, which are the pairs of signals associated with each of the binary variables, have left the a precharge state; and the $U_0$ unanimity cell generating a signal authorizing the precharge phase as soon as all inputs of the $U_0$ unanimity cell, which are the pairs of signals associated with each of the binary variables, have switched to the precharge state.

4. The method as claimed in claim 3, wherein the synchronization phase uses a general signal for resetting the binary variables to zero before the precharge phase, the general signal being ahead of the pair of signals.

5. The method as claimed in claim 4, wherein the synchronization phase uses:

the $U_1$ unanimity cell having inputs common to the differential network and generating a signal authorizing the evaluation phase as soon as all its inputs of the $U_1$ unanimity cell have left the precharge state; and a gate combining the output of the $U_1$ unanimity cell with the general signal, the combined general signal authorizing, depending on a binary value of the combined general signal, the precharge phase or the evaluation phase.

6. A programmable circuit, comprising:

gates comprising table-based cells defining a logic function of each of the table-based cells, said programmable circuit integrating a differential network configured to make calculations on binary variables, each of the binary variables comprising pairs of signals, the differential network comprising a first network of cells implementing logic functions on a first component of the pairs of signals and a second network of dual cells operating in complementary logic on a second component of the pairs of signals, wherein the programmable circuit is configured to make calculations on the binary variables during:
a precharge phase, in which the binary variables are put into a known state at an input of each cell of the programmable circuit,
an evaluation phase, in which a calculation is made by each cell of the programmable circuit, and
a synchronization phase, in which multiple signals representing multiple input binary variables are received and logic takes place on the multiple input binary variables, the synchronization phase being carried out before each of the precharge and evaluation phase, and the synchronization phase being carried out on a signal of the multiple signals having a greatest delay.

7. The circuit as claimed in claim 6, wherein the programmable circuit is further configured to carry out the synchronization phase for each cell of the differential network, by a rendezvous mechanism using unanimity cells, inputs of the unanimity cells being common to the inputs of said cells of the differential network and output of the unanimity cells controlling operation of said cells, a rendezvous of the rendezvous mechanism taking place when there is unanimity of values on the inputs of the unanimity cells, outputs of a gate changing when the rendezvous is reached.

8. The circuit as claimed in claim 7, wherein the programmable circuit is further configured to carry out the synchronization phase using two unanimity cells, $U_1$ unanimity cell and $U_0$ unanimity cell, having common inputs to the differential network and authorizing the evaluation phase and the precharge phase respectively:
 the $U_1$ unanimity cell generating a signal authorizing the evaluation phase as soon as all its inputs of the $U_1$ unanimity cell, which are the pairs of signals associated with each of the binary variables, have left a precharge state; and
 the $U_0$ unanimity cell generating a signal authorizing the precharge phase as soon as all inputs of the $U_0$ unanimity cell, which are the pairs of signals associated with each of the binary variables, have switched to the precharge state.

9. The circuit as claimed in claim 8, wherein the programmable circuit is further configured to use for the synchronization phase, a general signal for resetting the binary variables to zero before the precharge phase, the general signal being ahead of the pairs of signals.

10. The circuit as claimed in claim 9, wherein the synchronization phase uses:
 the $U_1$ unanimity cell having inputs common to the differential network and generating a signal authorizing the evaluation phase as soon as all of the inputs of the $U_1$ unanimity cell have left the precharge state; and
 a gate combining an output of the $U_1$ unanimity cell with the general signal, the combined general signal authorizing, depending on a binary value of the combined general signal, the precharge phase or the evaluation phase.

11. The circuit as claimed in claim 10, wherein each cell of the differential network comprises a memory defining a logic function associated with a tree of multiplexers, inputs of multiplexers of a first column of the tree of multiplexers receiving values of the memory, and an output of a last multiplexer forming an output of each cell, the combined general signal controlling the multiplexers of the first column, multiplexers of other columns being controlled by the input signals of the each cell.

12. The circuit as claimed in claim 11, wherein the pairs of signals of the binary variables are associated with the same column of multiplexers of the tree of multiplexers.

13. The circuit as claimed in claim 6, wherein the programmable circuit further comprises at least one protected gate, four cells being used to generate the at least one protected gate, two cells being used to produce a $U_1$ unanimity cell, and two cells being used for the differential network.

14. The circuit as claimed in claim 6, wherein the programmable circuit further comprises at least one protected gate, eight cells being used to generate the at least one protected gate, four cells being used to produce $U_1$ and $U_0$ unanimity cell, two cells being used for the differential network, and two cells being used for freezing outputs of the at least one protected gate.

15. The circuit as claimed in claim 6, wherein the programmable circuit further comprises at least one protected gate, two cells being used to generate a protected gate, the two cells being used to produce the differential network.

16. The circuit as claimed in claim 6, wherein the programmable circuit is further configured to perform a cryptography function.

17. The circuit as claimed in claim 6, wherein said programmable circuit is an FPGA type.

\* \* \* \* \*